March 19, 1935.   H. C. SCHAU   1,994,964
HOT WATER EXHAUSTER FOR CANNERS' USE
Filed Dec. 5, 1930   2 Sheets-Sheet 1
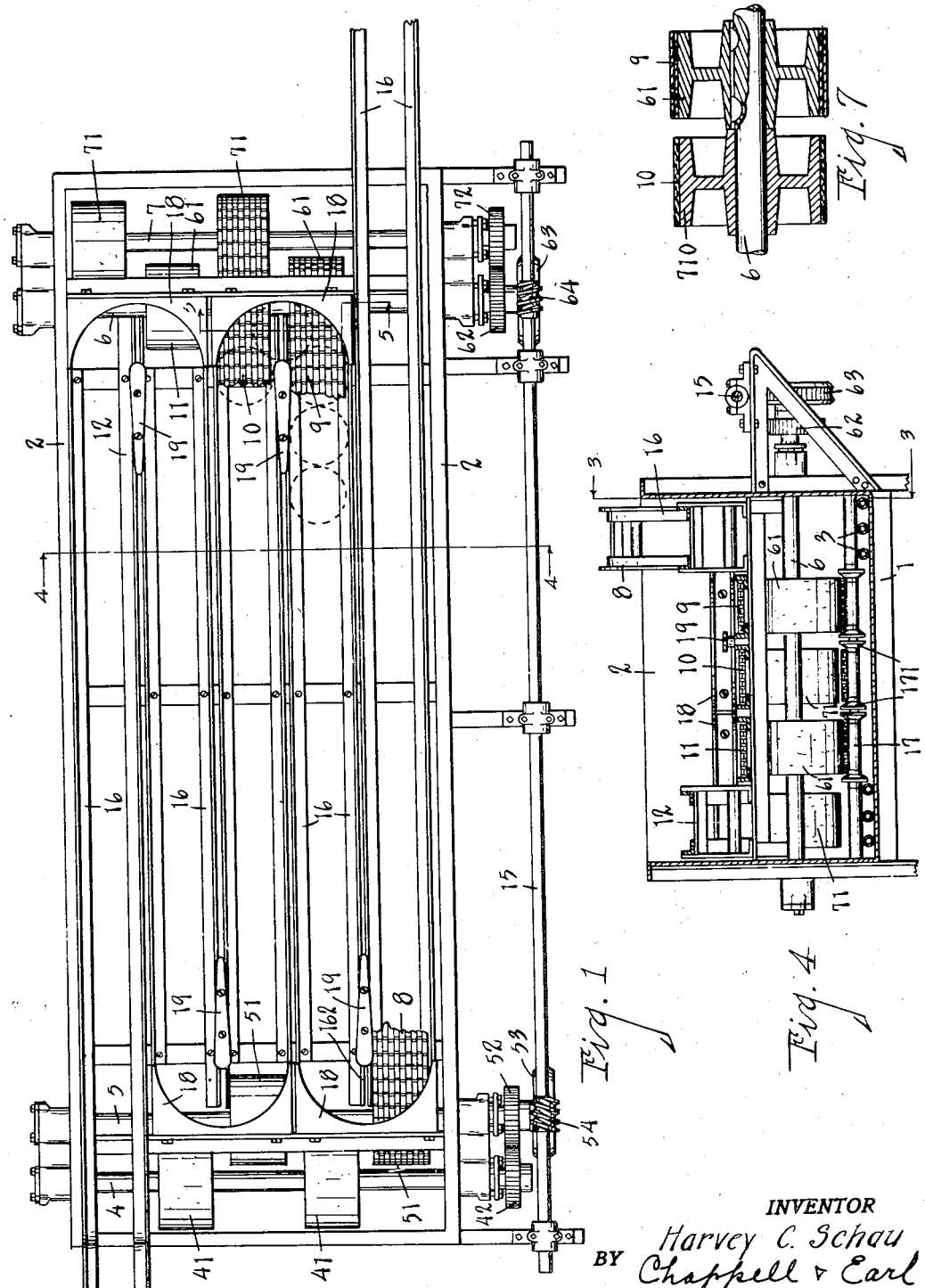

March 19, 1935.   H. C. SCHAU   1,994,964
HOT WATER EXHAUSTER FOR CANNERS' USE
Filed Dec. 5, 1930   2 Sheets-Sheet 2
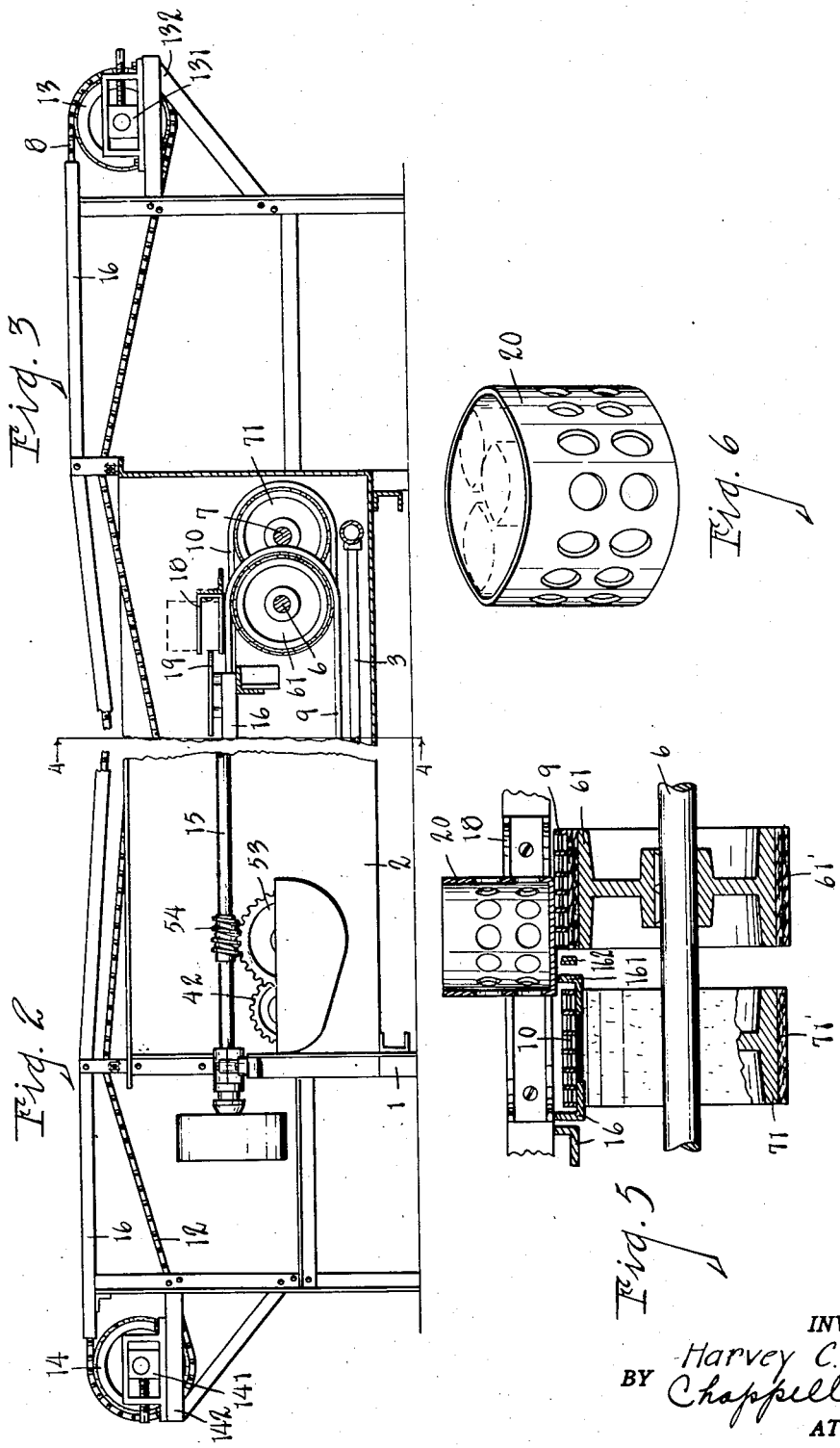
INVENTOR
Harvey C. Schau
BY Chappell + Earl
ATTORNEY Patented Mar. 19, 1935

1,994,964

UNITED STATES PATENT OFFICE 1,994,964

HOT WATER EXHAUSTER FOR CANNERS' USE

Harvey C. Schau, Kalamazoo, Mich., assignor to Dunkley Company, Kalamazoo, Mich.

Application December 5, 1930, Serial No. 500,219

12 Claims. (Cl. 198—82)

The invention is in effect a continuous hot water heater for handling and sterilizing the cans and contents and expelling the air prior to sealing when the vacuum method of sealing is employed in canning.

The objects of the invention are:

First, to provide in such a hot water exhauster an improved conveyor structure which can be made very compact and simple and the parts very positively actuated.

Second, to provide in such a structure an improved means of advancing the cans from one conveyor belt to another conveyor belt moving in the opposite direction.

Third, to provide improved driving means for such structure.

Fourth, to provide improved guide means between the reversely moving conveyor belts to facilitate the advancing of the cans from the one conveyor belt to another moving in opposite directions.

Objects pertaining to details of construction and operation will appear from the detailed description to follow. The invention is defined in the claims. A structure which is a preferred embodiment of the invention is illustrated in the accompanying drawings, in which:

Fig. 1 is a plan view of a hot water exhauster embodying the features of my invention, the intake and discharge ways being omitted and portions being broken away to show details.

Figs. 2 and 3 are associated elevational views of the entire machine, the central portion being broken away. Fig. 2 is an elevation of the left hand or discharge end of the machine. Fig. 3 is a vertical sectional elevation of the right hand or intake end of the machine, taken on section line 3—3 of Fig. 4.

Fig. 4 is a detail cross sectional elevation taken on line 4—4 of Figs. 1 and 3.

Fig. 5 is an enlarged detail elevation view partly in section, of an adjacent pair of the conveyors and the can transfer guide, the conveyors being in section on irregular line 5—5 of Fig. 1.

Fig. 6 is a perspective view of one of the perforated holders for the small size cans.

Fig. 7 is a detail of a modification similar to Fig. 5 with the conveyor 10 carried on a loose drum 710 on shaft 6, this tight and loose drum on the same shaft being the arrangement of drums on shafts 5 and 6 when only a single pair of conveyor shafts are used.

The parts of the drawings will be identified by the numerals of reference which are the same in all the views.

1 is the supporting framework. 2 is the open top tank for heating the open cans and their contents to cook and sterilize the same and expel the air. 3 is the usual heating coil. 4, 5, 6 and 7 are the conveyor shafts for the endless conveyors disposed around the same. 4 and 6 constitute one pair of shafts and 5 and 7 the other pair. 8 is the intake conveyor, 9 is the first return, 10 is the second conveyor, 11 the second return, and 12 is the discharge conveyor. The shaft 4 has conveyor drums 41, shaft 5 conveyor drums 51, shaft 6 conveyor drums 61, and shaft 7 conveyor drums 71. 13 is the intake conveyor drum and 14 is the discharge conveyor drum.

The intake conveyor drum 13 is supported on suitable adjustable bearings 131 on brackets 132, and the discharge conveyor drum 14 is supported on adjustable bearings 141 carried on bracket 142. The intake conveyor 8 is disposed over the drum 13 and the first drum 51 on the shaft 5. The return conveyor 9 is adjacent, running in the opposite direction, being carried on the first drum 41 of the shaft 4, and on the first drum 61 of the shaft 6. The conveyor 10, running to the left in Fig. 1, is carried on the first drum 71 of shaft 7 and the second drum 51 of shaft 5. The return conveyor 11 is carried on the second drum 41 of shaft 4 and on the second drum 61 of shaft 6. The discharge conveyor 12 is carried on the second drum 71 of shaft 7 and the discharge drum 14. Shafts 4, 5, 6 and 7 are each provided with intermeshing spur gears 42, 52, 62 and 72 respectively. On shaft 5 is also disposed a worm gear 53 and on shaft 6 is disposed a worm gear 63, one of which gears is a right hand worm and the other a left hand worm gear. A longitudinal shaft 15 is disposed to drive these gears, being provided with right hand and left hand worms 54 and 64 respectively.

The upper run of each conveyor is supported in suitable angle bar rails 16 and the under run passes over supporting guide rollers 17 provided with guiding flange disks 171 (see Fig. 4). At each end of each pair of conveyors is a semi-circular can guide 18 supported a little distance above the conveyor (see Figs. 1, 4 and 5). The discharge end of each conveyor is a little higher than the receiving end of the conveyor adjacent thereto. This extra height is secured by increasing the thickness of the lagging of the conveyor roller at the discharge point. The lagging on the conveyor roll 51 is thicker than that on conveyor roll 41, and the lagging on conveyor roll 61 is thicker than lagging on conveyor roll 71. This is clearly illustrated in Fig. 5, where the lagging 61' on the roll 61 is thicker than the lagging 71' on the roll 71. The lagging is one or more layers of canvas belt secured to the periphery of the drum or roller.

At the opposite ends and between each upper run and supported from the angle bars beneath, is a guide 19 with rounded end towards the ends of the conveyors and with tapered sides extended between the said angle bars. This forms a rounded runway between the said runs to facilitate the discharge of the can from one run to the other. The angle bars 16 are extended into close proximity to the guide runs above the runway, and are of slightly different height, as seen at 161, 161. The guide at 162 is beveled towards the discharge end of the conveyor, the highest point being substantially on the level with the upper surface thereof. The guide 162 is slightly lower and beveled in the same direction to insure the delivery of the can in that direction.

Because of the close proximity of the guide 162 to the lower level of the receiving conveyor, the can or container will be advanced substantially or more than half its width over the lower conveyor, so that when it tips down the greater part of its weight is transferred to the said lower conveyor and it is rapidly passed around the guide 19.

In operation it will be readily understood that cans with their open tops are placed on the intake conveyor and are advanced through to the end of it, then owing to the fact that the discharge end is a little elevated over the receiving end of the adjacent return conveyor, the cans will be advanced until their edges project over and are engaged by the returning conveyor.

This action is enhanced by the action of the guide means 161, 162 and the guide 19, which insures that the can in tipping will drop with considerably more than half of its weight on the receiving conveyor.

Additional cans advance into the rear of the first by rotary movement which on contacting effectively pass the cans from one conveyor to the next. When small cans are being filled they are placed in perforated holders 20 (see Fig. 6) and these large holders pass along the conveyors the same as large size cans, carrying their contained small size cans.

Shafts 4 and 7 can be dispensed with by alternate tight and loose conveyor drum arrangement and the advantage of the right and left screw drive be secured. This arrangement of drums is fully shown in my patent application Serial No. 136,342, filed September 18, 1926.

I have described my improved machine in its preferred form. I am aware that it can be greatly varied in its details without departing from my invention. The particular drive means I have illustrated is very simple, there is no thrust on the bearings, and the machine is consequently very easy to operate. Other important features could be made use of with any kind of drive. I desire to claim the invention broadly and also in the specific form illustrated, as pointed out in the appended claims.

Having thus described my invention, what I claim as new and desire to secure by Letters Patent is:

1. The combination of a suitable frame, an open top tank, duplicate pairs of conveyor driving shafts, one of each pair at the opposite ends of said tank, intermeshing gears on the shafts at each end of the tank, right and left hand worm gears on one of each said pairs of shafts, a longitudinal shaft with right and left hand worms to drive the same to operate the conveyors in opposite directions thereby positively driving all of said shafts, an intake conveyor at one side and a discharge conveyor at the opposite side, intermediate alternate conveyor belts traveling in opposite directions, conveyor drums on said shafts carrying the conveyors in parallel relation, the adjacent conveyors traveling in opposite directions, the discharge end of each conveyor being at higher elevation than the receiving end of the adjacent oppositely-traveling conveyor due to increased diameter of the drum at the discharge end, guide rails for the upper run of each conveyor, guide supports between the conveyors' ends tapered upwardly from the direction of the higher conveyor, and semi-circular guides embracing the discharge end of each conveyor and the corresponding receiving end of the adjacent conveyor to discharge from one conveyor belt to the adjacent returning belt, coacting as specified.

2. The combination of a suitable frame, an open top tank, duplicate pairs of conveyor driving shafts, one of each pair at the opposite ends of said tank, intermeshing gears on the shafts at each end of the tank, right and left hand worm gears on one of each said pairs of shafts, a longitudinal shaft with right and left hand worms to drive the same to operate the conveyors in opposite directions, an intake conveyor at one side and a discharge conveyor at the opposite side, intermediate alternate conveyor belts traveling in opposite directions, conveyor drums on said shafts carrying the conveyors in parallel relation, the adjacent conveyors traveling in opposite directions, the discharge end of each conveyor being at higher elevation than the receiving end of the adjacent oppositely-traveling conveyor, guide supports between the conveyors' ends tapered upwardly from the direction of the higher conveyor, and semi-circular guides embracing the discharge end of each conveyor and the corresponding receiving end of the adjacent conveyor to discharge from one conveyor belt to the adjacent returning belt.

3. The combination of a suitable frame, an open top tank, duplicate pairs of conveyor driving shafts, one of each pair at the opposite ends of said tank, intermeshing gears on the shafts at each end of the tank, drive means for said shafts to operate the conveyors in opposite directions, an intake conveyor at one side and a discharge conveyor at the opposite side, intermediate alternate conveyor belts traveling in opposite directions, conveyor drums on said shafts carrying the conveyors in parallel relation, the adjacent conveyors traveling in opposite directions, the discharge end of each conveyor being at higher elevation than the receiving end of the adjacent oppositely-traveling conveyor, guide supports between the conveyors' ends tapered upwardly from the direction of the higher conveyor, and semi-circular guides embracing the discharge end of each conveyor and the corresponding receiving end of the adjacent conveyor to discharge from one conveyor belt to the adjacent returning belt.

4. The combination of a suitable frame, an open top tank, duplicate pairs of conveyor driving shafts, one of each pair at the opposite ends of said tank, right and left hand worm gears on one of each said pairs of shafts, a longitudinal shaft with right and left hand worms to drive the same to operate the conveyors in opposite directions, an intake conveyor at one side and a discharge conveyor at the opposite side, intermediate alternate conveyor belts traveling in opposite directions, conveyor drums on said shafts carrying the adjacent conveyors in parallel relation, the adjacent conveyors traveling in opposite directions, the discharge end of each conveyor being at higher elevation than the receiving end of the adjacent oppositely-traveling conveyor, guide supports between the conveyors' ends tapered upwardly from the direction of the higher conveyor, and semi-circular guides embracing the discharge end of each conveyor and the corresponding receiving end of the adjacent conveyor to discharge from one conveyor belt to the adjacent returning belt.

5. The combination of a suitable frame, an open top tank, duplicate pairs of conveyor driving shafts, one of each pair at the opposite ends of said tank, drive means for said shafts to operate the conveyors in opposite directions, an intake conveyor at one side and a discharge conveyor at the opposite side, intermediate alternate conveyor belts traveling in opposite directions, conveyor drums on said shafts carrying the conveyors in parallel relation, the adjacent conveyors traveling in opposite directions, the discharge end of each conveyor being at higher elevation than the receiving end of the adjacent oppositely-traveling conveyor, guide supports between the conveyors' ends tapered upwardly from the direction of the higher conveyor, and semi-circular guides embracing the discharge end of each conveyor and the corresponding receiving end of the adjacent conveyor to discharge from one conveyor belt to the adjacent returning belt.

6. The combination in a hot water exhauster for canners' use of suitable parallel delivery belts running in opposite directions the discharge end of the belt being materially higher than the receiving end of the adjacent belt, semi-circular guides embracing the discharge end of each conveyor and the corresponding receiving end of the adjacent conveyor to guide and discharge the cans from one conveyor belt to the adjacent returning belt, an intermediate tapered guide with rounded end towards the ends of said conveyors, and guide supports between the conveyors' ends tapered upwardly from the direction of the higher conveyor, the outer of which is substantially the height of the higher conveyor.

7. The combination in a hot water exhauster for canners' use of suitable parallel delivery belts running in opposite directions the discharge end of the belt being materially higher than the receiving end of the adjacent belt, semi-circular guides embracing the discharge end of each conveyor and the corresponding receiving end of the adjacent conveyor to guide and discharge the cans from one conveyor belt to the adjacent returning belt, guide supports between the conveyors' ends tapered upwardly from the direction of the higher conveyor, and an intermediate tapered guide with rounded end towards the ends of said conveyors.

8. The combination in a hot water exhauster for canners' use of suitable parallel delivery belts running in opposite directions, guides embracing the discharge end of each conveyor and the corresponding receiving end of the adjacent conveyor the discharge end being higher than the adjacent receiving end to guide and discharge the cans from one conveyor belt to the adjacent returning belt, and guide supports between the conveyors' ends tapered upwardly from the direction of the discharge conveyor with its edge higher than the receiving conveyor, the outer of which is substantially the height of the higher conveyor.

9. In a machine of the class described, the combination, of a plurality of endless belts having their upper stretches arranged in proximity to the same horizontal plane, means for driving adjacent belts in opposite directions, and devices for deflecting articles from one end of one belt to the adjacent end of the adjacent belt, whereby the articles may be conveyed successively the lengths of the upper stretches of the several belts, the forward end portion of each belt that receives the articles being stepped downwardly from the level of the adjacent portion of the rear end of the preceding belt.

10. In a machine of the class described, the combination, of a plurality of endless belts having their upper stretches arranged in proximity to the same horizontal plane with adjacent belts inclined longitudinally in opposite directions, so as to space the forward end of each belt a distance below the rear end portion of the preceding belt, means for driving adjacent belts in reverse directions, and devices associated with the ends of the belts for deflecting the articles from the end of one belt to the adjacent end of the other belt whereby the articles are carried successively the length of the stretches of the several belts.

11. In a machine of the class described, the combination, of a plurality of endless belts having their upper stretches arranged in proximity to the same horizontal plane, pulleys over which the belts pass arranged adjacent the ends of the upper stretches of the belts, a shaft on which the pulleys adjacent each end of the belts are mounted, alternate pulleys being secured to the shafts, means for driving the shafts in opposite directions so as to cause adjacent belts to travel in opposite directions, and devices for deflecting articles from one end of one belt to the adjacent end of the adjacent belt whereby the articles may be conveyed successively the length of the upper stretches of the several belts, the forward end portion of each belt that receives the articles being stepped downwardly from the level of the adjacent portion of the rear end of the preceding belt.

12. In a machine of the class described, the combination, of a plurality of endless belts having their upper stretches arranged in proximity to the same horizontal plane, pulleys over which the belts pass arranged adjacent the ends of the upper stretches of the belts, a shaft on which the pulleys adjacent each end of the belts are mounted, alternate pulleys being secured to the shafts, means for driving the shafts in opposite directions so as to cause adjacent belts to travel in opposite directions, and devices for deflecting articles from one end of one belt to the adjacent end of the adjacent belt whereby the articles may be conveyed successively the length of the upper stretches of the several belts; in which the pulleys at the forward ends of the upper stretches of the belts being of smaller diameter than the pulleys at the rear ends thereof.

HARVEY C. SCHAU.